Figure 5:
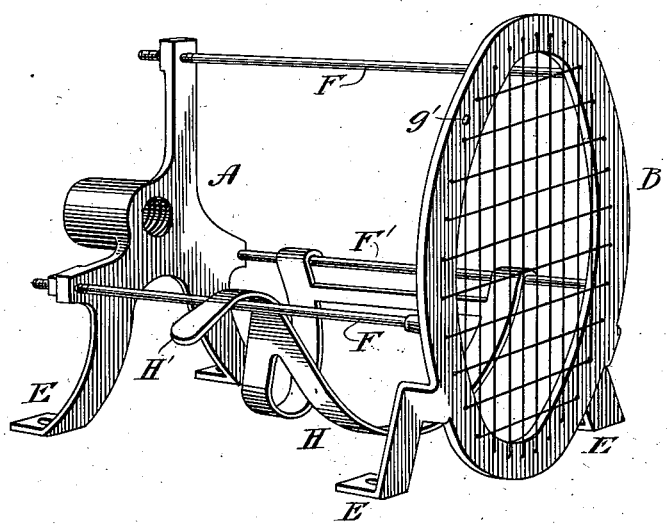

(No Model.) 2 Sheets—Sheet 1.
W. H. GRANT.
BUTTER CUTTING APPARATUS.
No. 497,319. Patented May 16, 1893.
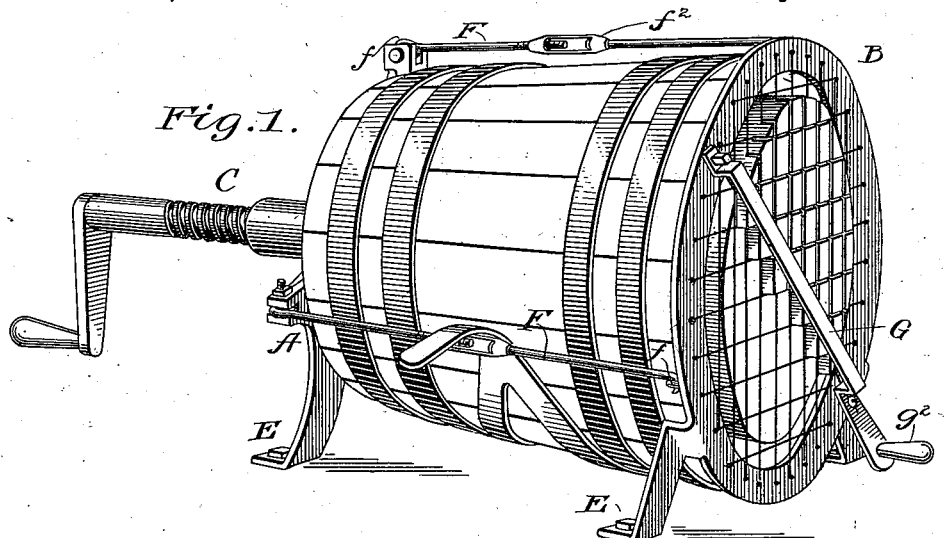
Fig. 1.
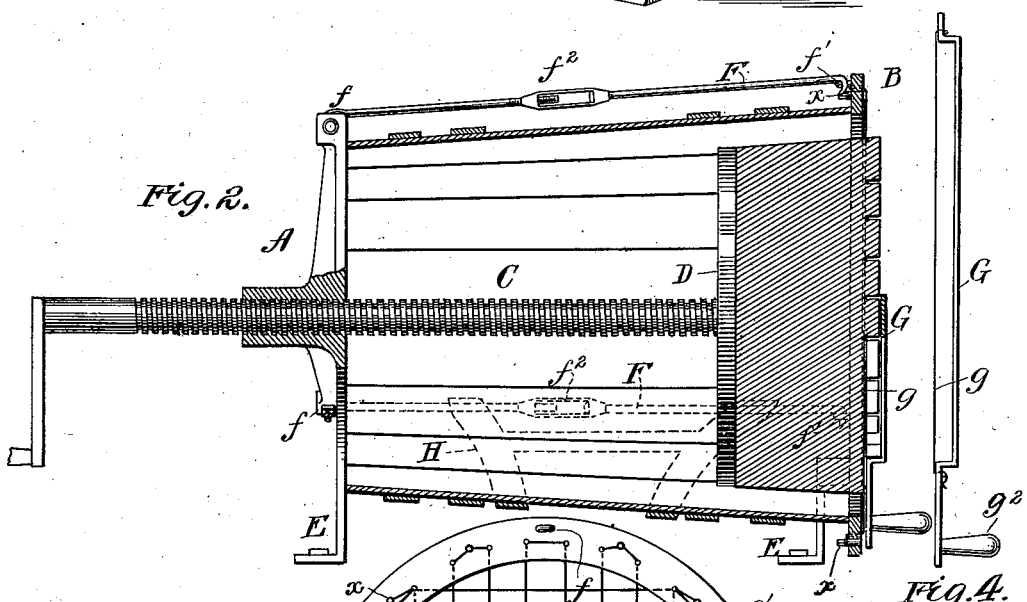
Fig. 2.
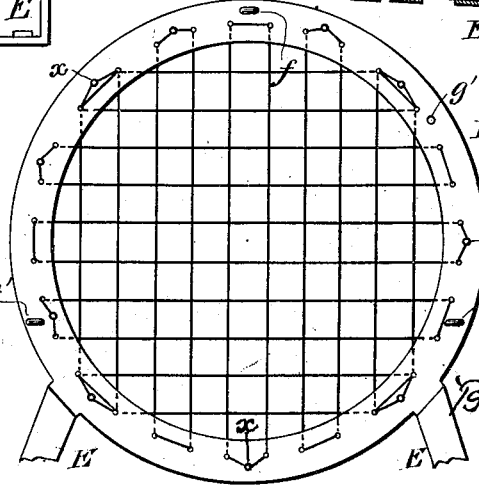
Fig. 3.
Fig. 4.
WITNESSES:
Frank S. Ober
Catharine Georgi
INVENTOR
William H Grant
BY
Baldwin, Davidson & Wight
ATTORNEYS.

(No Model.) 2 Sheets—Sheet 2.

W. H. GRANT.
BUTTER CUTTING APPARATUS.

No. 497,319. Patented May 16, 1893.

WITNESSES:

INVENTOR

BY

ATTORNEYS.

UNITED STATES PATENT OFFICE.

WILLIAM H. GRANT, OF BROOKLYN, NEW YORK.

BUTTER-CUTTING APPARATUS.

SPECIFICATION forming part of Letters Patent No. 497,319, dated May 16, 1893.

Application filed January 31, 1893. Serial No. 460,252. (No model.)

*To all whom it may concern:*

Be it known that I, WILLIAM H. GRANT, a citizen of the United States, residing at Brooklyn, in the county of Kings and State of New York, have invented certain new and useful Improvements in Butter-Cutting Apparatus, of which the following is a specification.

The invention relates to an apparatus for cutting up butter into small prints or pieces for table use in restaurants and hotels. Ordinarily the tubs of butter are cut up by hand into pieces of the required size and shape or printed in molds by hand. In the former case considerable labor is involved in cutting the butter, and where much is used, the cost becomes an important item in the business. In the latter, the printing of the butter not only involves a greater amount of labor, but also actual loss in weight and injury to the butter, for the reason that the water is pressed out of it. I have found from experience that from two to three pounds of water are pressed out of a single tub of butter, when it is so printed for table use. One result of this is that the flavor of the butter is impaired and it does not keep so well. The salt comes out with the water and this affects the flavor.

With my improved organization, a tub of butter may be cut into prints or pats of suitable size for table use in several minutes without squeezing any material quantity of water therefrom. I employ a holder for the tub having at the larger end a series of crossed wires through the openings of which the butter is pressed to the desired extent by a follower at the opposite end and then cut off by a transversely acting strained wire cutter. The butter is thus divided into prints of proper size, which may be allowed to fall into a tub of cold water. By making the openings formed by the wires of suitable size, my invention may be used by venders of butter. A given length of a certain cross-section will with little variation be of a given weight. The proper quantity may be conveniently supplied to a purchaser in an attractive and desirable form.

The details of construction and the subject matter claimed are hereinafter specifically designated.

The accompanying drawings illustrate my invention in a form which I have shown by practical use to be a desirable and efficient one.

Figure 1 is a perspective view of the apparatus with a tub of butter mounted therein, showing the butter forced beyond the cutting wires, and part of the divided end thereof cut off by the transversely moving cutter. Fig. 2 is a vertical longitudinal section through the same; Fig. 3 an elevation of the inner face of the end ring or frame piece, carrying the strained cutting wires; Fig. 4 a detailed view illustrating the transversely acting cutter; and Fig. 5 shows the application of a cradle for supporting the butter tub in proper position.

The apparatus as illustrated in Figs. 1 and 2 has two ends or frame pieces A B. That marked A is a three armed spider having a screwthreaded hub in which a screw C works. The screw is provided at the outer end with a crank handle and carries upon its inner end a plate or follower D. The end piece marked B is shown in the form of a ring. It might be of any other desired shape. It has strained across the opening thereof two series of wires arranged transversely to each other so as to form a series of rectangular openings. Both of the parts A B may be provided as shown with feet E to support the apparatus in a horizontal position. The two end pieces of the frame are connected by rod connections F each hinged at $f$ to the end of one of the spider arms and formed at the opposite end with a hook that engages an eye $f'$ upon the face of the ring A. Each rod connection F is provided with an adjusting swiveling nut $f^2$. As seen from the accompanying drawings each rod connection F may be loosened and disengaged from its eye in the ring B. When either of them is loosened and turned back, the tub of butter may be dropped or rolled into position, after having its top and bottom removed. The tub of butter is then brought into such position that the butter at the large end is all opposite the strained wires and that at the other end opposite the plunger D. The tub may now be clamped between the spider A and ring B by screwing up the swivel nut $f^2$, and the screw C being turned to force the follower D against the butter, the larger end of the butter is pressed against and beyond the strained cutting wires which divide it into pats or prints as clearly seen in Fig. 1.

It is not necessary to clamp the tub between the parts A B, because the butter is supported at the large end by the strained cutting wires and at the smaller end by the follower D. When the butter has been forced a sufficient distance beyond the cutting wires to form prints or pats of the proper thickness, it is severed by a transversely moving knife which may be constructed substantially as shown. A cutter frame or bar G is offset in its length, and a cutting wire $g$ strained across the offset. At one end, the bar is pivoted at $g'$ to the ring, and at the other end is provided with a laterally projecting swiveling handle $g^2$. The cutting wire $g$ bears upon and sweeps across the network of cutting wires strained across the opening of the ring, and by sweeping it across the end of the ring, the butter may be cut off, and the pats or prints allowed to fall into a tub of cold water or otherwise disposed of.

It is very easy to cut the butter pats of uniform thickness since a given extent of movement of the screw will project a uniform thickness of butter beyond the cutting wires.

In Fig. 3, the two series of cutting wires strained across the opening of the ring B and the manner of mounting and tightening them are shown. A single piece of wire is passed through an aperture in one side of the ring, extends to the opposite side passing through two apertures and back again through an aperture adjacent to the first named one. Both ends of the wire may be then passed through holes in a plug $x$ seated in the ring and having squared ends as seen in Fig. 2. By turning this plug, the wires may be strained to any desired extent. The construction is that ordinarily used for tightening piano wires except that for convenience and economy, the two ends of the wires are brought to and connect with the same plug.

In Fig. 5, I have shown two end pieces A B connected by side bars or rods F. A cradle H having a taper corresponding with that of the butter tub is hinged upon one of the side bars and its opposite side is provided with a handle H'. The tub of butter being dropped into position upon the cradle may be lifted until its opposite ends properly register or come into line with the cutting wires of the ring B and the follower D. In this figure, the side bars are not adjustable. Such adjustment is not necessary because as before stated, the butter will be supported between the cutting wires and the follower D and will in turn support the tub. The cradle is also indicated in Fig. 1, where the handle H' is seen.

The details of construction may of course be varied without departing from my invention.

I claim as my invention—

1. The combination, substantially as set forth, of the end pieces, the open frame connecting them and permitting of the lateral insertion of a tub of butter between the end pieces, the cutting wires strained across the openings of one end piece to cut the butter into pats, the follower adapted to press against the opposite end or side of the butter, and means for operating the follower to press the butter beyond the cutting wires.

2. The combination, substantially as set forth, of the end piece A, the screw working therein and having the follower D, the end piece B having the cutting wires strained across the opening thereof, the side bars, and the pivoted cradle for lifting the butter tub into proper position.

3. The combination, substantially as set forth, of the spider provided with supporting feet, the end piece or ring also having supporting feet, the side bars connecting the spider and ring, the strained wires extending across the ring, the screw working in the spider, the follower carried thereby, and the transversely movable cutter.

4. The combination, substantially as set forth, of the end piece A, the screw working therein and having the follower D, the end piece B having the cutting wires strained across the opening thereof, the side bars or rods, and a transversely moving cutter consisting of a frame or bar pivoted to the end piece B, and a strained cutting wire.

In testimony whereof I have hereunto subscribed my name.

WILLIAM H. GRANT.

Witnesses:
 FRANK S. OBER,
 EDWD. A. CALAHAN.